United States Patent [19]
Nieto

[11] Patent Number: 5,662,235
[45] Date of Patent: Sep. 2, 1997

[54] RECEPTACLE FOR RECYCLABLE MATERIALS

[76] Inventor: Daniel Nieto, 851 Suellen Dr., Tracy, Calif. 95376-1786

[21] Appl. No.: 645,085

[22] Filed: May 13, 1996

[51] Int. Cl.⁶ ................................................. B65D 1/24
[52] U.S. Cl. ................. 220/23.86; 220/410; 220/909; 220/524
[58] Field of Search ................. 220/23.83, 23.86, 220/909, 555, 551, 531, 410, 524

[56] References Cited

U.S. PATENT DOCUMENTS

| | | | |
|---|---|---|---|
| 4,682,699 | 7/1987 | Erdley. | |
| 4,801,034 | 1/1989 | Sandomeno. | |
| 4,821,903 | 4/1989 | Hayes. | |
| 4,834,253 | 5/1989 | Crine. | |
| 4,905,853 | 3/1990 | Strawder | 220/909 |
| 4,974,746 | 12/1990 | Dickinson | 220/909 |
| 5,005,727 | 4/1991 | Roth | 220/909 |
| 5,046,635 | 9/1991 | Haas et al. | 220/909 |
| 5,111,958 | 5/1992 | Witthoeft | 220/909 |
| 5,143,246 | 9/1992 | Johnson et al. | |
| 5,152,420 | 10/1992 | Bird et al. | 220/909 |
| 5,303,841 | 4/1994 | Mezey | 220/909 |
| 5,392,942 | 2/1995 | Hanson. | |
| 5,398,838 | 3/1995 | Dosunmu | 220/909 |
| 5,458,350 | 10/1995 | Johnson et al. | 220/909 |

FOREIGN PATENT DOCUMENTS

| | | |
|---|---|---|
| 1073895 | 6/1967 | Canada. |
| 193023 | 11/1964 | Sweden. |
| PCTDE91/ 00063 | 8/1991 | WIPO ................. 220/909 |

*Primary Examiner*—Joseph M. Moy
*Attorney, Agent, or Firm*—Dennis H. Lambert

[57] ABSTRACT

A receptacle for recyclable materials includes an outer housing with a plurality of separate containers removably held therein for receiving different types of recyclable materials, such as glass, metal, plastic and paper refuse normally encountered in a typical household. The outer housing has a removable cover with a plurality of openings therein and a separate pivotable lid closing each opening. Each opening and associated lid is in alignment with a respective container held in the housing, so that material can be placed through the openings in the cover and into the respective containers without the need for removing the cover from the housing. When one or more containers are full, the cover can be removed and the container or containers lifted out by a handle attached to the container. Provision on the housing cover of a lid for each container simplifies emptying of the individual containers when they are removed from the housing. The receptacle of the invention can be used for separately storing other materials, such as, e.g., soiled laundry.

14 Claims, 6 Drawing Sheets

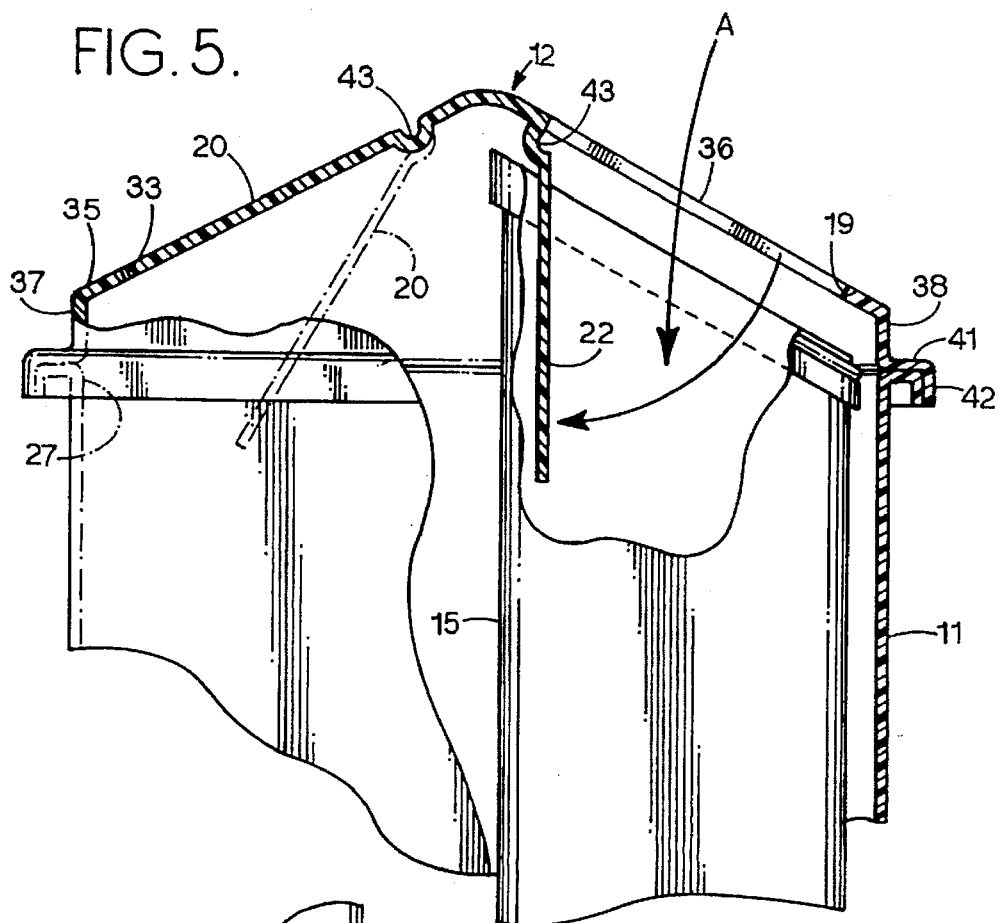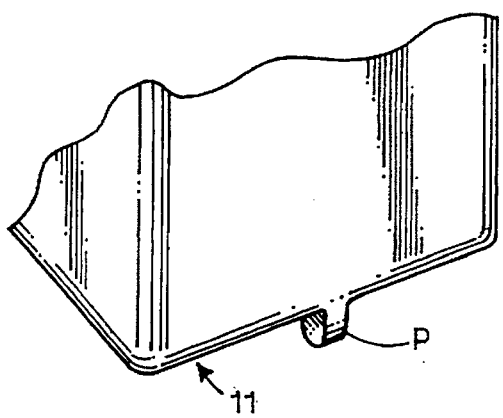

RECEPTACLE FOR RECYCLABLE MATERIALS

BACKGROUND OF THE INVENTION

1. Field of the Invention

This invention relates to containers for holding material, and more particularly, to a receptacle having multiple compartments for holding different materials separate from one another in a single housing. The receptacle of the invention is especially suited for storing recyclable household refuse, such as metal, plastic, glass and paper.

2. Prior Art

In the past, little thought was given to the collection and disposal of refuse, especially that normally generated by a typical household. Consequently, all types of refuse, including glass, metal, plastic, paper and other material has been disposed of in a common receptacle or container.

In recent years, however, ecological concerns have led to the desirability, if not the need, to separate refuse into different, recyclable components, i.e., glass, metal, plastic, paper and other materials. Public agencies have encouraged separation of refuse into broad recyclable categories, and public and private waste management companies have provided different receptacles for use by the consumer in disposing of different materials.

In order to facilitate separation and storage of the different recyclable materials, a variety of multi-compartmented trash receptacles have been developed for use by the consumer. Such prior art receptacles are exemplified in U.S. Pat. Nos. 4,682,699, 4,801,034, 4,821,903, 4,834,253, 5,143,246 and 5,392,942. All of these patentable devices provide multiple compartments for receiving and storing different types of refuse, such as plastic, metal and glass, for example. Some of them further comprise an outer housing in which plural containers are received for storing the different types of refuse. Others, such as that shown in U.S. Pat. No. 4,821,903, simply provide a frame work for holding and supporting multiple containers for the different types of refuse. Some of these patents also provide a cover for the housing that holds the multiple containers, and other of these patents provide separate lids or covers on the outer housing for each container held therein.

In these prior art receptacles, the housing cover must be removed before refuse can be placed in any of the containers held in the housing, or as in the case of U.S. Pat. No. 5,392,942, the housing itself does not have a cover, per se, but instead individual covers or lid are provided for covering each container held in the housing.

While the prior art receptacles discussed above afford many advantages in the separation, storage and collection of different kinds of household refuse, they still do not provide the ease of use, compact design, and sanitary conditions desirable for use by the average consumer.

Accordingly, there is need for a receptacle for storing different kinds of refuse or other materials, in which the receptacle is simple in construction and economical to produce, and which is compact and easy to use, especially in a home environment, and which further provides a sanitary environment when in use.

SUMMARY OF THE INVENTION

It is therefore an object of the present invention to provide a simple and economical receptacle for storing different types of refuse in different compartments, and wherein the receptacle is easy to use and provides a sanitary environment.

A more specific object of the invention is to provide a receptacle for recyclable materials, wherein an outer housing holds a plurality of separate containers therein for receiving different types of recyclable materials, such as glass, metal, plastic and paper refuse normally encountered in a typical household. The outer housing has a removable cover with a separate pivotable lid in alignment with each container held in the housing, so that refuse can be placed in the respective containers without the need for removing the cover from the housing. This feature contributes significantly to the sanitary condition maintained by the receptacle of the invention. It also contributes significantly to the ease of use of the invention. When one or more containers are full, the cover can be removed and the container or containers lifted out by handle attached to the container. Provision of a lid for each container on the housing cover simplifies emptying of the individual containers when they are removed from the housing.

The multi-compartment receptacle of the invention could also be used for separately storing other materials, such as, e.g., dirty laundry. In other words, whites could be placed in one compartment, delicate fabrics in another, and still other types of fabrics in yet further compartments.

BRIEF DESCRIPTION OF THE DRAWINGS

The foregoing, as well as other objects and advantages of the invention, will become apparent from the following detailed description when considered in conjunction with the accompanying drawings, wherein like reference characters designate like parts throughout the several views, and wherein:

FIG. 4 is a fragmentary perspective view of a rear bottom portion of the receptacle, showing a prop that may be used to hold the receptacle in level position when in use.

FIG. 5 is an enlarged fragmentary sectional view of a top portion of the receptacle, depicting the manner in which the individual lids carried by the housing cover may be opened to deposit material into the respective containers.

DETAILED DESCRIPTION OF THE PREFERRED EMBODIMENTS

Figure 1:
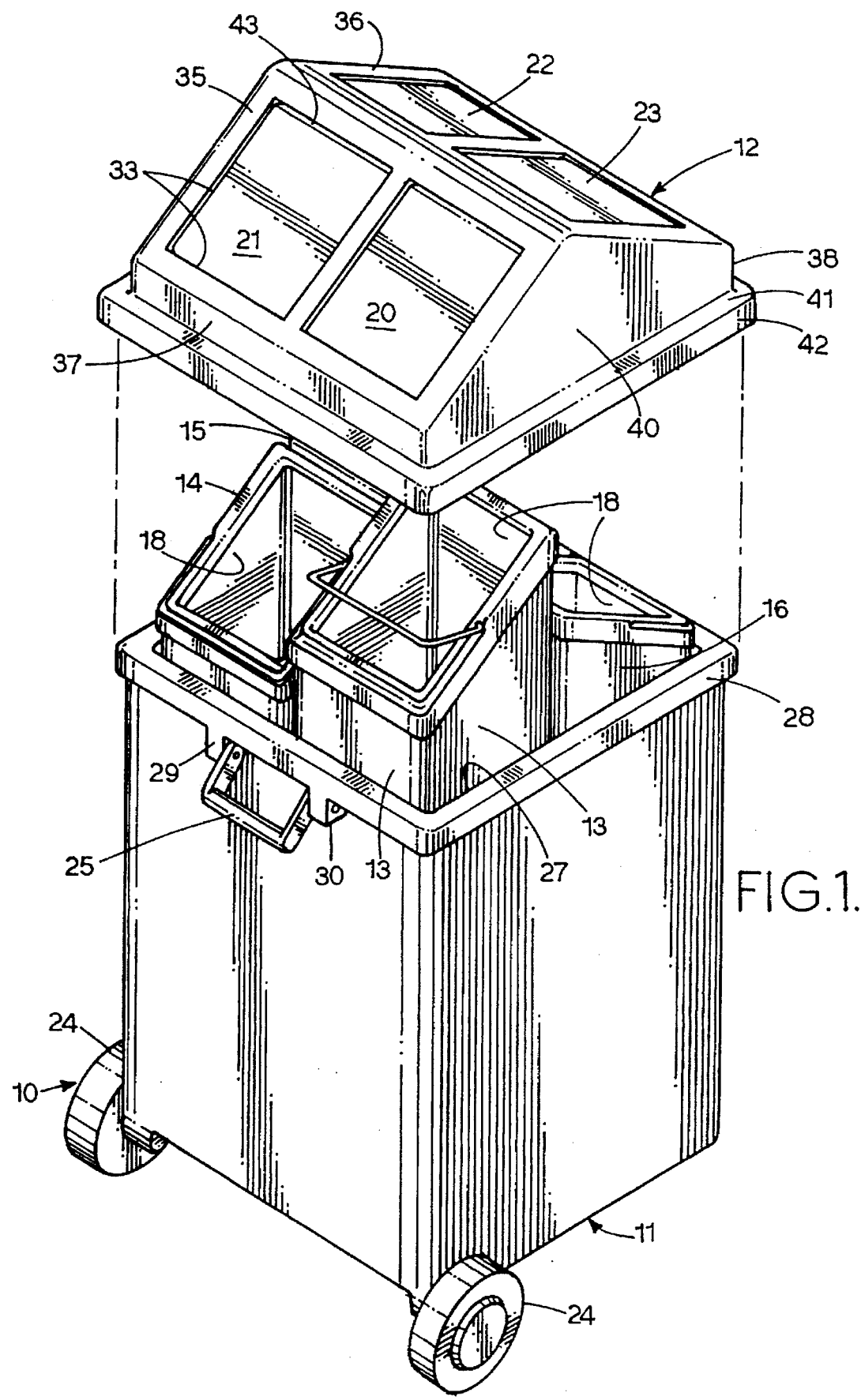
FIG. 1 is a front, top, exploded perspective view of the receptacle of the invention.

Referring more particularly to the drawings, and especially to FIG. 1, the receptacle of the invention is indicated generally at 10, and includes a housing 11 having a removable cover 12. A plurality of separate containers 13, 14, 15 and 16 are received in the housing and have open upper ends 18 in substantial alignment with openings 19 in the cover, having pivotable lids 20, 21, 22 and 23 for closing the openings.

The housing 10 may be provided with wheels 24 and a handle 25 so that the handle can serve as a cart to make the receptacle easily transportable.

Figure 2:
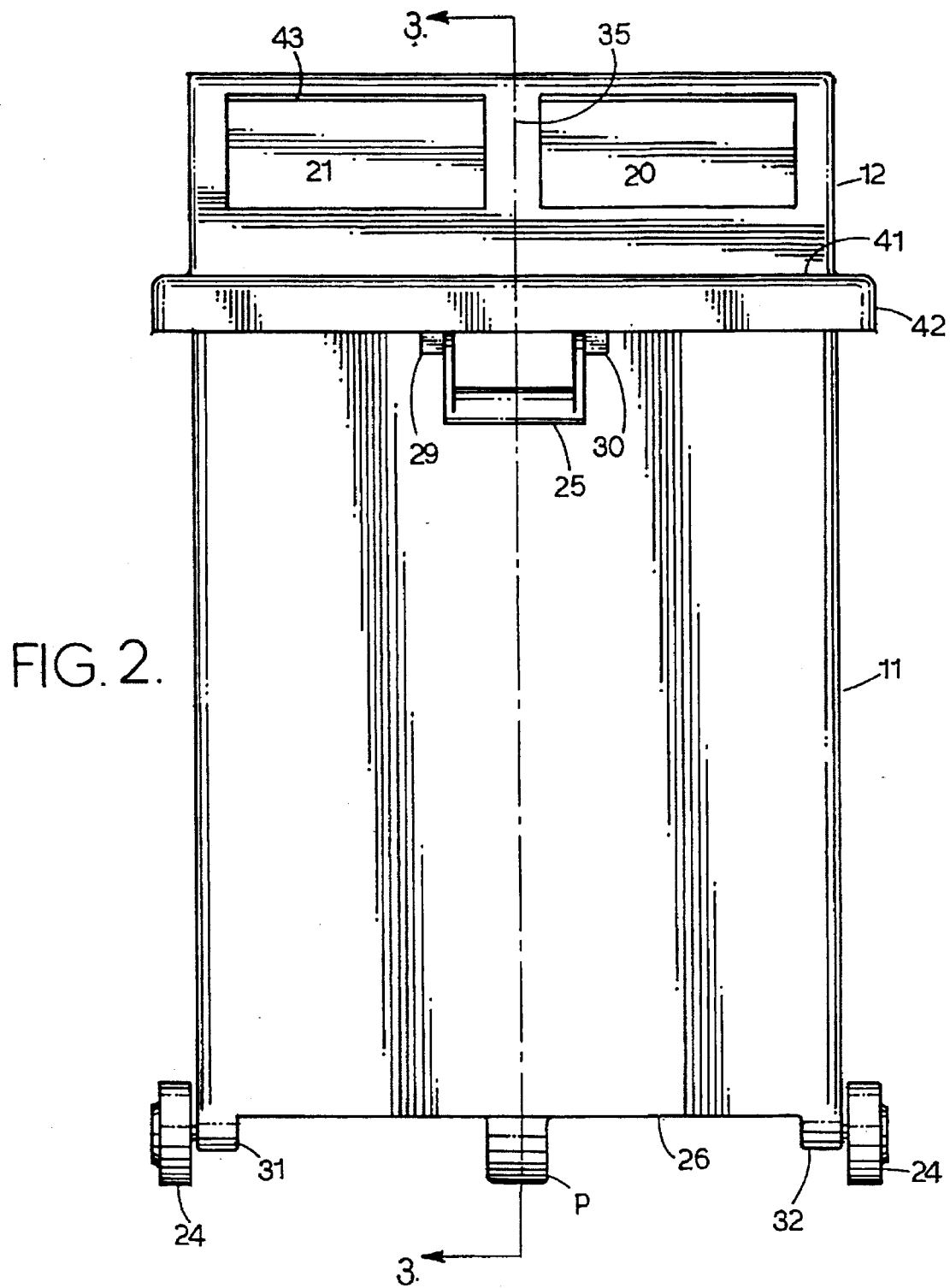
FIG. 2 is a front elevational view thereof.
Figure 3:
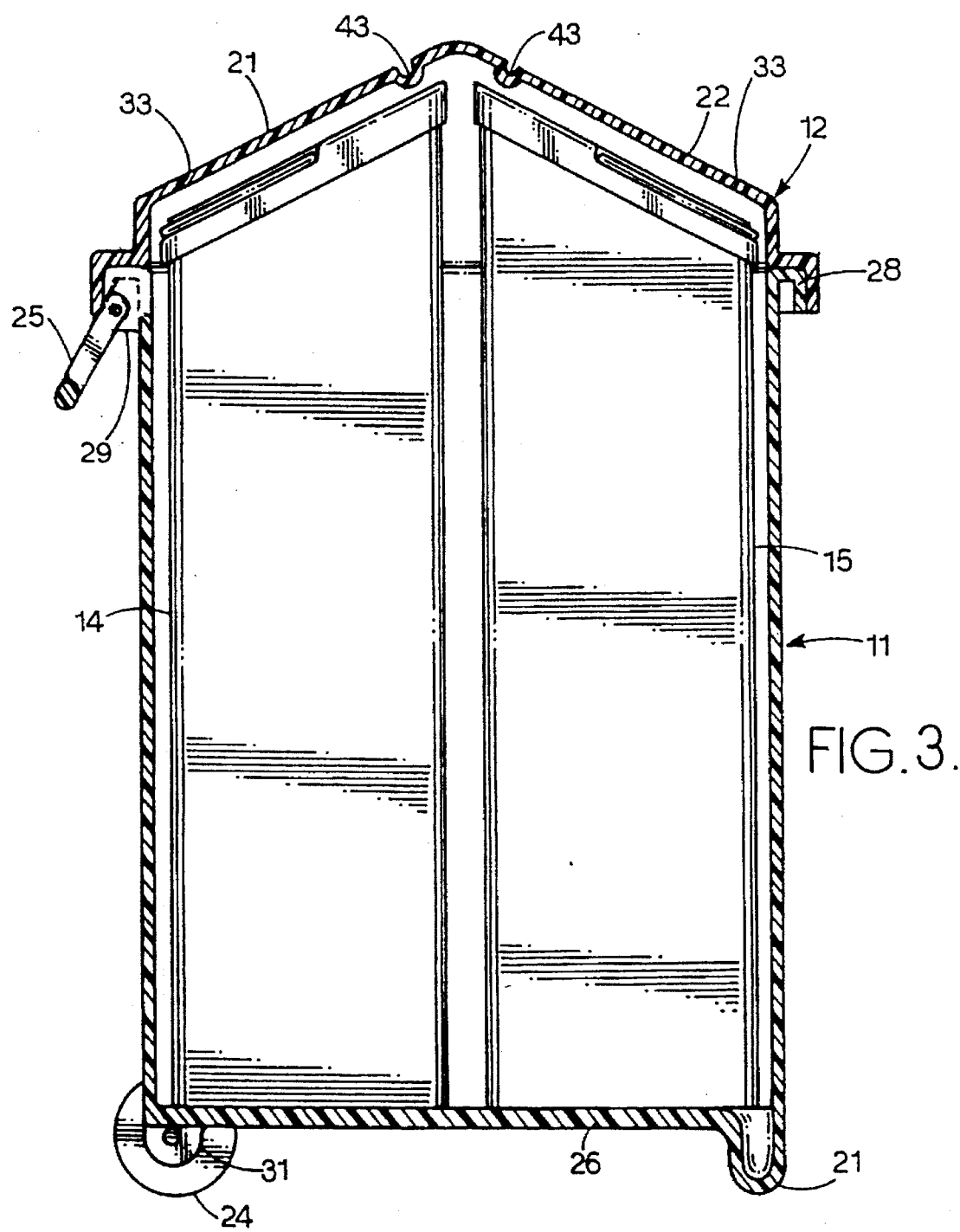
FIG. 3 is a longitudinal sectional view thereof, taken along line 3—3 in FIG. 2.
Figure 6:
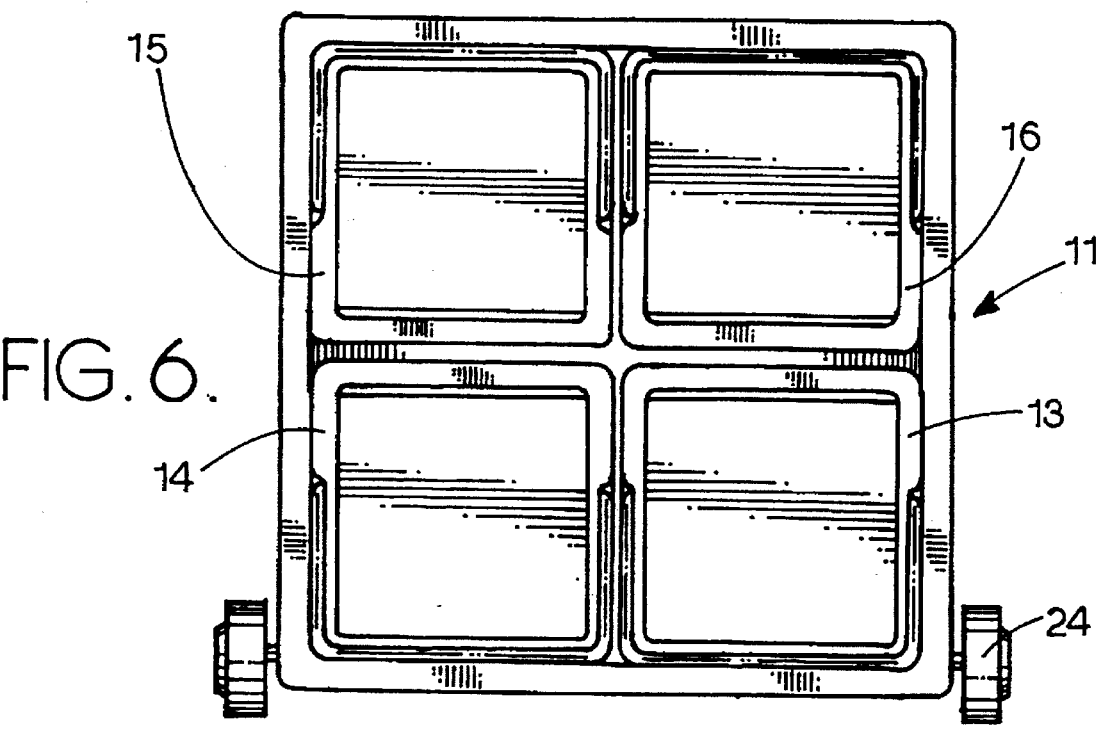
FIG. 6 is a top plan view of the receptacle of the invention, with the cover removed to show the relationship of the containers in the housing.

Further, and with reference to FIGS. 2, 3 and 4, a small projection or prop P may be provided on a bottom edge of the housing 11 opposite the wheels 24 to support the housing in a level position when it is in use.

The housing 11 comprises a rectangularly-shaped enclosure in one specific example of its construction, and includes a bottom wall 26 and an open top 27. An inverted, channel-shaped flange 28 is formed around the periphery of the open top and serves to reinforce the housing. In addition, the flange 28 defines a ledge on which the cover 12 rests when placed on the housing.

The handle 25 is pivotably mounted on a pair of brackets 29 and 30 formed integrally with the container in the area of the inverted channel-shaped flange 28 at the same side of the housing on which the wheels 24 are mounted. Similarly, the wheels 24 are pivotably mounted on brackets 31 and 32 at opposite sides of the housing on the bottom wall 26. (See FIGS. 2 and 3).

In a specific example of the invention, the housing is molded from a synthetic plastic material, and has an overall height dimension of 24 to 30 inches, and has a width and depth of approximately 24 inches.

The cover 12 is generally triangularly-shaped in transverse cross-section, with opposite downwardly sloping top walls 35 and 36 terminating at their lower edges in relatively narrow depending vertical walls 37 and 38. Generally triangularly-shaped end walls 39 and 40 close the opposite ends of the cover, and the side and end walls 37–40 terminate at their bottom edges in a radially outwardly directed horizontal flange 41 which, in turn, terminates it at its outer edge in a depending vertical flange 42. The flanges 41 and 42 are adapted to receive in nesting relationship the inverted channel-shaped flange 28 on the upper end of the housing 11 when the cover 12 is placed on the housing.

The pivotable lids 20–23 are joined to the respective top walls 35 and 36 by spring hinges 43 which function to hold the lids in coplanar, closed relationship with respect to the openings 19 formed through the walls 35 and 36, but which enable the lids to be pushed downwardly as indicated in FIG. 5 to deposit material into the underlying container 15, as represented by the arrow A.

In a specific construction according to the invention, the cover 12 is molded in one piece from a synthetic plastic material, and the pivotable lids 20–23 are formed by providing lines of separation or areas 33 devoid of material around three sides of the lids, to separate the lids from the associated top walls 35 and 36, except at the area of the hinges 43, which are molded integrally with the cover and lids. The springs 43 have memory so that they return the lids to their at-rest position coplanar with the walls 35 and 36 when pressure is released from them. Further, each lid may have suitable indicia "I" provided thereon to indicate the type of material to be placed in the receptacle beneath that lid. This indicia may be interchangeable so that it can be used to identify different materials, as desired.

In the specific example of the invention illustrated and described herein, there are four containers 13–16 held in the housing 11. The containers are all identically constructed and are adapted to fit in the housing so that individual containers may be removed, when desired.

Figure 8:
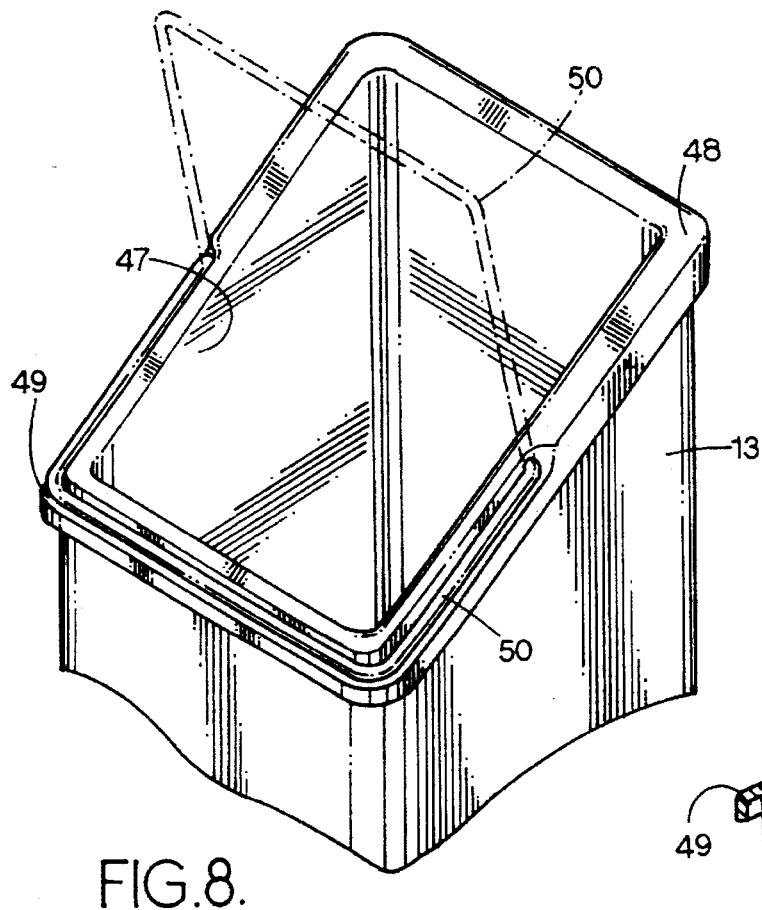
FIG. 8 is an enlarged fragmentary top perspective view of a top portion of one of the containers, showing the relationship of the container and container handle.
Figure 7:
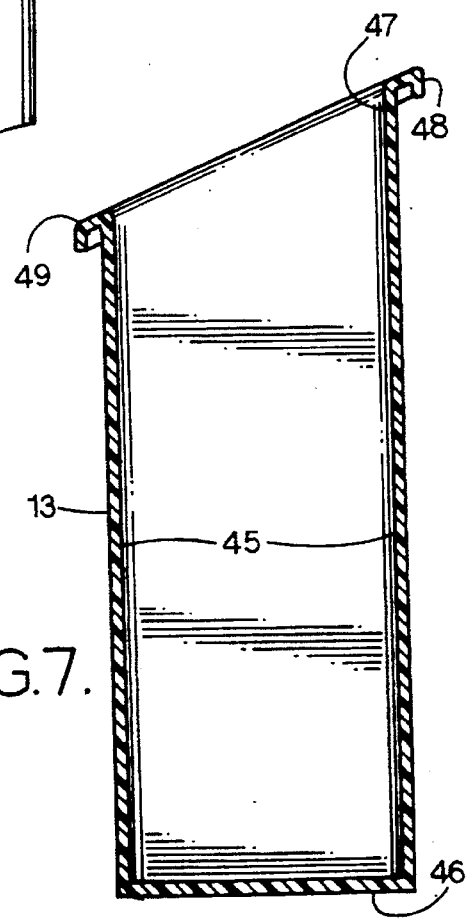
FIG. 7 is a longitudinal sectional view of one of the containers used in the invention.

Each container is rectangularly shaped, with opposite side walls 45, a bottom wall 46, and an open top 47. An inverted, channel-shaped flange 48 is formed around the periphery of the open lid to reinforce the container. As seen in FIG. 8, the flange 48 may be recessed at 49 along one side and approximately half the two adjacent sides to accommodate a pivotable handle 50 that can be stored in the recessed area 49 in an out of the way position when not in use, or pivoted to an upright position to enable the container to be lifted.

The open top 47 is slanted complementary to the slope of the top walls 35 and 36 of the cover 12, so that the open top extends into close, underlying relationship with the cover and in vertical alignment with the openings 19 and pivoted lids 20–23, respectively. In this respect, it will be noted that the dimensions of the open top 47 and of the lids 20–23 are such that the lids can be pivoted downwardly into the open upper end of the respective containers when it is desired to deposit material into the containers.

Provision of the pivotable lids in the housing cover enables material to be placed into the container without the necessity of removing the cover, and at the same time results in all of the containers remaining essentially closed except that in which material is being deposited. This improves the ease of use and also greatly improves sanitation. The receptacle of the invention is lightweight and compact in construction, facilitating its use in a home environment, and is easily transportable. Moreover, it lends itself to use for a variety if purposes, including collection of soiled laundry, as well as collection of different types of refuse to be recycled. It provides functions and advantages not found in prior art receptacles, including those discussed previously herein, and can be made in a variety of sizes and colors to fit any decor.

While particular embodiments of the invention have been illustrated and described in detail herein, it should be understood that various changes and modifications may be made to the invention without departing from the spirit and intent of the invention as defined by the scope of the appended claims.

What is claimed is:

1. A receptacle for recyclable materials, comprising:
    an outer housing having side walls, a bottom wall and an open top;
    a plurality of separate containers removably held within the housing for receiving different types of materials to be held separate from one another;
    a removable cover on the open top of the housing for closing the open top, but removable to permit access to the containers for removing them from the housing, said cover having oppositely sloping top walls;
    a plurality of openings in the sloping top walls of the cover, with a separate pivotable lid closing each opening and with each lid in substantial alignment with a respective container held in the housing, so that the lids may be individually and separately opened for deposit of material through the openings in the cover and into the respective containers without the need for removing the cover from the housing, whereby when one or more containers are full, the cover can be removed and the container or containers lifted out to empty the contents for further disposition thereof, as desired; and
    said containers each having side walls, a bottom wall and an open top, said open top being slanted complementally to the slope of the cover top walls so that the open tops of the containers lie closely adjacent and parallel to the underside of the cover when the cover is in place over the open top of the housing, thereby minimizing the likelihood that material placed through a lid in the cover will enter a receptacle other than that aligned with the lid.

2. A receptacle as claimed 1, wherein:
    each container has a foldable handle thereon which may be folded to a stored position out of the way, and raised to an operable position to facilitate lifting and handling of the container.

3. A receptacle as claimed in claim 2, wherein:

wheels are provided on said housing to facilitate movement thereof from one location to another.

4. A receptacle as claimed in claim 3, wherein:

said cover has generally a triangular shape in transverse cross-section, with oppositely sloping top walls, and the openings and associated lids are in the sloping top walls.

5. A receptacle as claimed in claim 1, wherein:

the lids are integrally formed with the cover and are joined thereto by spring hinge means which maintain the lids in closed, coplanar relationship with the cover, and which resiliently yield when downward force is applied to the lid to enable the lid to be moved to an open position.

6. A receptacle as claimed in claim 1, wherein:

the housing is rectangularly-shaped, and the containers are rectangularly-shaped and are adapted to fit in side-by-side relationship in the housing.

7. A receptacle as claimed in claim 6, wherein:

there are four containers arranged in two rows in the housing.

8. A receptacle as claimed in claim 7, wherein:

said cover has generally a triangular shape in transverse cross-section, with oppositely sloping top walls, and the openings and associated lids are in the sloping top walls.

9. A receptacle as claimed in claim 2, wherein:

the housing is rectangularly-shaped, and the containers are rectangularly-shaped and are adapted to fit in side-by-side relationship in the housing.

10. A receptacle as claimed in claim 9, wherein:

there are four containers arranged in two rows in the housing.

11. A receptacle as claimed in claim 10, wherein:

wheels are provided on said housing to facilitate movement thereof from one location to another.

12. A receptacle as claimed in claim 1, wherein:

said housing, cover and containers are all made of molded plastic material.

13. A receptacle as claimed in claim 12, wherein:

the lids are integrally formed with the cover and are joined thereto by spring hinge means which maintain the lids in closed, coplanar relationship with the cover, and which resiliently yield when downward force is applied to the lid to enable the lid to be moved to an open position.

14. A receptacle as claimed in claim 13, wherein:

said cover has generally a triangular shape in transverse cross-section with oppositely sloping top walls, and the openings and associated lids are in the sloping top walls.

* * * * *